Sept. 9, 1941.    H. REASONER    2,255,187
MAGNETIC SWITCH MEANS
Filed Oct. 26, 1940
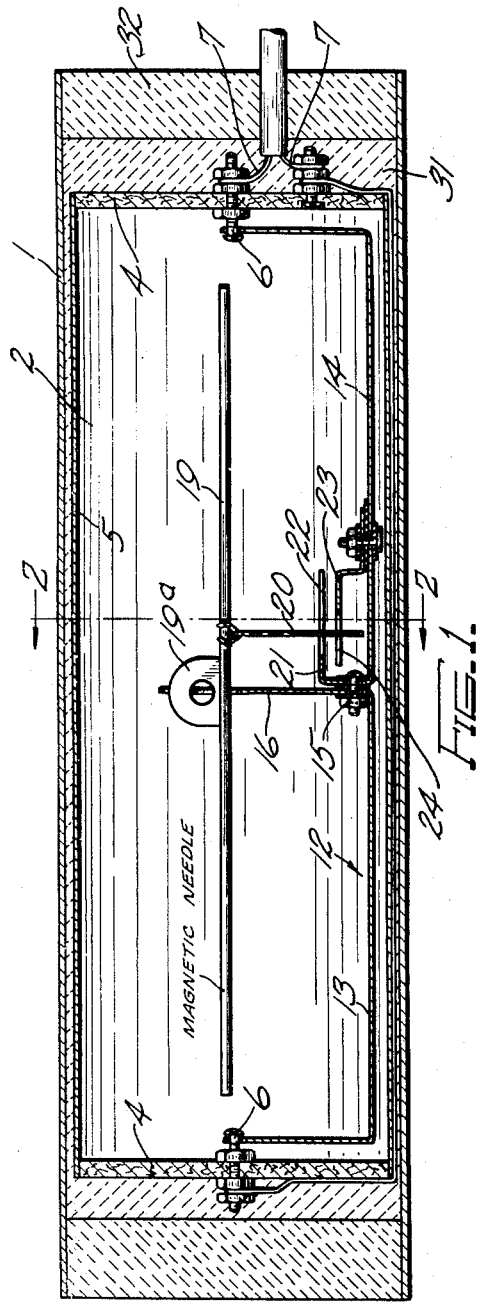
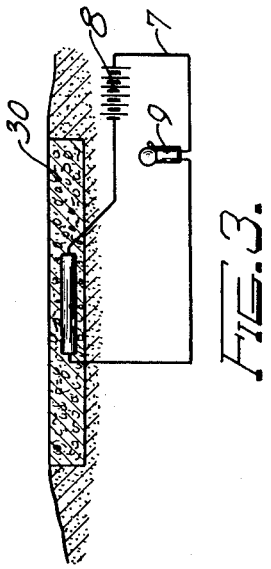
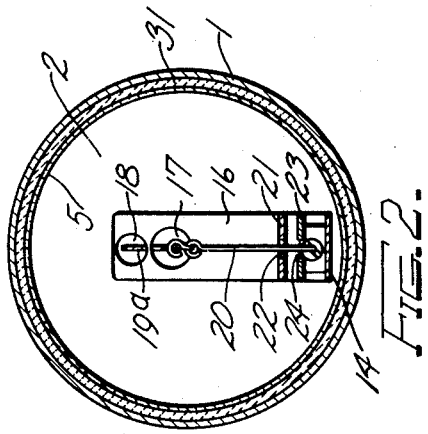
Inventor
HERMAN REASONER
By Owen & Owen
Attorneys Patented Sept. 9, 1941

2,255,187

UNITED STATES PATENT OFFICE 2,255,187

MAGNETIC SWITCH MEANS

Herman Reasoner, Delphos, Ohio, assignor to The Real Signal Company, Delphos, Ohio, a corporation of Ohio Application October 26, 1940, Serial No. 362,930

6 Claims. (Cl. 200—87)

This invention relates to electric switches of the magnetically operated type and particularly those adapted to be operated by passing vehicles to effect the closing of an electric circuit having a signal device or other electrical energy translating means in connection therewith.

The primary object of the invention is the provision in connection with an electric circuit, of a switch of simple, novel and improved construction which is responsive to changes in the earth's normal magnetic field occasioned by the passage of a motor vehicle, or the like, through such field in the vicinity of a switch, whereby a signal, for instance, may be energized to indicate the presence or passage of the vehicle.

A further object of the invention is the provision of a switch of this character, which is composed of a minimum number of parts, is free of springs, mercury, or the like, as operating parts, and may be placed in numerous positions without interfering with its effective operation.

Further objects and advantages of the invention will be apparent from the following detailed description, and from the accompanying drawing illustrating one embodiment thereof, in which—

Figure 1 is a central longitudinal section of a device embodying the invention; Fig. 2 is a cross-section thereof on the line 2—2 in Fig. 1, and Fig. 3 is a wiring diagram of the invention in applied relation to a pavement.

In the drawing, the detector embodying the invention is shown as including an outer container or holder 1 and an inner case 2, which latter is sealed in the container and in which the operative parts of the detector are mounted.

The case 2, in the present instance, is of cylindrical form in cross-section and comprises the two opposed ends 4 of disk-form and the cylindrical side wall 5, preferably but not necessarily of a transparent nature, to permit the inner working parts of the instrument to be viewed therethrough. The side wall and ends of the case are of a non-magnetic nature and the ends are preferably of an electrical insulating material.

Mounted in each end 4 of the case 2, preferably centrally thereof and in axial alignment, is an electric terminal stud 6 adapted at its outer end for connection with an electrical conductor and having its inner end projecting a distance into the interior of the case to form a pivot. One side of an electric circuit 7 is connected to the outer end of one stud 6 and the other side of the circuit is connected to the other stud 6, as shown, or in any other suitable manner. Said circuit may have connection with any suitable source of electrical supply, as for instance a battery 8, and may have any suitable signal device or electrically operated translating means 9 interposed therein, whereby a current passing through the circuit will be translated into some form of signal.

A cradle 12 of U-form is disposed lengthwise within the case 2 and has its legs pivotally mounted on the inner ends of the respective studs 6 to permit free transverse swinging or turning movements of the cradle within the case with the loop portion thereof extending lengthwise of the case and disposed at one side of the pivotal axis. It is apparent that when the case is in reclining position the cradle is normally retained by gravity in upright position with its loop portion down, as shown.

The cradle 12 is of electrically conductive material and is divided into two sections 13 and 14, each including a leg and a portion of the loop of the cradle and being connected in a rigid electrical insulated manner at 15, as by a bolt and insulating washers, as shown. One section, 13 in the present instance, terminates in an upstanding arm 16 in electrical connection with such section and disposed between the two legs of the cradle. This arm is provided at its upper or free end, in the present instance, with two openings 17, 18, through the lower of which is freely projected a magnetic needle 19 which is suspended by a loop 19ª from the bottom wall of the upper opening in a manner to permit free swinging movements of the needle in any direction, as is apparent. This needle terminates at its ends short of the ends of the cradle, and its point of suspension is substantially midway of the cradle length.

A switch arm 20 is suspended for free swinging movements from the needle 19 at the side of its point of suspension, which is over the cradle section 14, and is adapted to make electrical contact with a portion of the section 14 when the needle 19 swings horizontally from a normal north and south position due to the distortion of the normal magnetic field in which the needle 19 is disposed. When the arm 20 has been swung a predetermined extent from normal, it contacts the cradle section 14 and closes the electric circuit in which disposed, it being understood that the needle 19 and switch arm 20 form part of such circuit.

In the present instance, the portion of the cradle section 14 with which the arm 20 coacts comprises a finger 21 extending upward and then lengthwise of the section 14 and having its horizontal or lengthwise extending portion slotted at 22 lengthwise of the normal position of the needle 19 and in position for the switch arm 20 to pass downward therethrough free from contact with its walls when such needle is in normal position. A predetermined lateral or horizontal swinging of the needle from normal position will cause the suspended arm 20 to contact one side or the other of the slot wall and close the signal circuit.

For the purpose of a quick make and break action of the switch parts, it is found desirable in practice to provide the cradle section 14 with a fulcrum piece 23 for the arm 21, which piece is disposed beneath the finger 21 in spaced relation to its slotted portion and has a slot or opening 24 in central vertical register with the slot or opening 22 and slightly narrower. This causes the arm 20, when swung laterally in either direction, to first engage one or the other side wall of the opening 24 and to then rock about such point of engagement as a fulcrum during a continued swinging of the arm and make contact with the finger 21 to close the electric circuit. The member 23 is insulatingly carried by the loop portion of the cradle section so that the circuit is not closed until the members 20 and 21 make contact.

The container or housing 1 is of non-magnetic material and of strong and durable construction to permit rough handling and to be buried in a driveway 30 or disposed in any other location suitable for the use intended. It is also, in the present instance, of cylindrical form and larger in diameter and length than the case 2. This case with its operative parts is sealed in the container in any suitable manner, as by depositing paraffine 31 around the case within the container and suitably sealing the ends of the container, as by plastic sealing means 32. The circuit wires 7 which connect with the terminal stud 6 may enter through the material 32 in one of the ends of the container.

This device is particularly adapted and intended for use in connection with filling stations, or the like, to detect and indicate to the operator the approach of a vehicle to the station. In such case the container 1 with the detector instrument mounted therein is buried in the driveway over or adjacent to which the vehicle passes in driving into the station, care being taken to position the container with its longitudinal axis substantially horizontally disposed and in as nearly a north and south position as it can be placed. This latter is necessary, as the earth's normal magnetic field will then hold the needle 19 in position for the switch arm 20 to hang free from contact with the companion switch member 21. The approach of a vehicle to the station in the vicinity of the detector will cause a distortion of the normal magnetic field surrounding the needle 19, thereby causing the needle to move in response to such change and to move the suspended switch arm 20 therewith into contact with one side or the other of the slot wall in the switch member 21, thus closing the signal circuit in which the switch is disposed. In this movement of the switch finger 20, it first engages the fulcrum member 24 and is then caused to rock about it and to move into engagement with the switch member 21 during the continued swinging movement of the finger. This effects a quicker and more efficient making and breaking of the circuit in response to movements of the magnetic needle 19 than would be the case if the finger moved directly into contact with the companion switch finger 21 without first engaging the fulcrum member 24. In practice, the pivotal mounting of the cradle member 12 is found to be of considerable value, as it insures the positioning of the switch in upright position with the needle 19 in a true vertical plane over the finger slot 22 irrespective of the position in which the instrument may be placed, so long as its longitudinal axis is substantially horizontal.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a device of the class described, an electric circuit having an electrically operated translating device therein, a mount, a normally open electric switch in said circuit having a suspended contact member and a stationary member operable to make contact to close the circuit, the stationary member having an opening through which the suspended member projects normally free from contact with its side walls, and movable means from which said first member is suspended for swinging movements therewith and relative thereto, said last means being responsive to predetermined changes in the surrounding magnetic field to move said suspended member into engagement with one or the other of opposed side walls of said stationary member opening, and means fixed relative to said stationary member normally free from contact with said suspended member and having fulcruming engagement with the suspended member to cause it to rock thereabout during a movement of the suspended member into contact with the stationary member.

2. In a device of the class described, an electric circuit having an electrically operated translating device therein, a sealed hollow case, a cradle mounted for gravity movements in said case and having insulatingly separated parts in said circuit, one of said parts having an upstanding arm and the other part having a stationary switch member, a magnetic needle movably carried by said upstanding part with a portion thereof disposed over said switch member, a second switch member suspended from said needle for movements therewith, said suspended member being in electrical connection with one side of the circuit and said stationary member in electrical connection with the other side of the circuit, said suspended member being free from contact with the stationary member when the surrounding magnetic field is normal and being moved by said needle into circuit closing contact with the stationary member by the needle when the surrouding magnetic field has been distorted from normal a predetermined extent.

3. In a magnetic switch means, a mount, a normally open electric switch having a suspended contact member movable into and out of contact with its companion, movable means from which said member is suspended for relative swinging movements, said means being responsive to predetermined changes in the surrounding magnetic field to move said contact member to open and close the switch, and means in the path of movement of said contact member and about which it rocks as a fulcrum in engaging its companion switch member.

4. In a device of the class described, a mount, a normally open electric switch carried by said mount and having a suspended contact member and a stationary member operable to make circuit closing contact, the stationary member having portions between which the suspended member projects normally free from contact with either, and movable means from which said first member is suspended for swinging movements therewith and relative thereto, said last means being responsive to predetermined changes in the surrounding magnetic field to move said suspended member into engagement with one or the other of the spaced portions of said stationary member, and means fixed relative to said stationary member normally free from contact with said suspended member and having fulcruming engagement with the suspended member to cause it to rock thereabout during a movement of the suspended member into contact with the stationary member.

5. A magnetic switch for use in an electric signal circuit and responsive to changes in the earth's normal magnetic field occasioned by the passage through such field in the vicinity of the switch of field distorting objects, a closed hollow elongated case having a substantially horizontal position in use and having horizontally spaced parts, circuit closing switch members mounted within the case between said parts for vertical swinging movements as a unit through a complete circle and gravity actuated to normally assume one position relative to a vertical irrespective of the position of the case so long as its longitudinal axis is substantially horizontal, said switch members being normally spaced, and means magnetically operable by a distortion of the surrounding magnetic field to effect movement of one of said members relative to the other to close the switch.

6. A magnetic switch for use in an electric signal circuit and operable by changes in the earth's normal magnetic field occasioned by the passage of a vehicle or the like through such field, including a case, a U-shaped cradle in the case with its legs horizontally spaced and pivoted therein in axially aligned relation to render the cradle swingable in a vertical plane in the case, said cradle being insulatingly separated lengthwise thereof into two parts each including a respective leg and a portion of the loop of the cradle, said parts being connected to separate portions of the associated electric circuit, one of said parts having a needle supporting arm intermediate said legs and the other part having a switch member in fixed relation thereto, a magnetic needle carried for free universal rocking movements by said first part, a movable switch member suspended from said needle, said movable member being free from contact with said other switch member when the surrounding magnetic field is normal and being moved by said needle into circuit closing contact with the other member when the surrounding magnetic field is distorted a predetermined extent from normal.

HERMAN REASONER.